(12) United States Patent
Ng et al.

(10) Patent No.: US 10,027,220 B2
(45) Date of Patent: Jul. 17, 2018

(54) INTERLEAVED POWER SUPPLIES AND CORRESPONDING CONTROL METHODS

(71) Applicant: Astec International Limited, Kowloon (HK)

(72) Inventors: Weng Fai Ng, Tseung Kwan O (HK); Ka Kit Li, Yuen Long (HK); Shu Lin He, Tseung Kwan O (HK); Chun Shing Cheng, Tseung Kwan O (HK); Chung Hang Ling, Shatin (HK)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 2 days.

(21) Appl. No.: 15/298,923

(22) Filed: Oct. 20, 2016

(65) Prior Publication Data
US 2018/0115235 A1 Apr. 26, 2018

(51) Int. Cl.
*H02M 1/08* (2006.01)
*H02M 1/42* (2007.01)
*H02M 1/00* (2006.01)

(52) U.S. Cl.
CPC .............. *H02M 1/083* (2013.01); *H02M 1/08* (2013.01); *H02M 1/42* (2013.01); *H02M 2001/0009* (2013.01)

(58) Field of Classification Search
CPC .................................. H02M 3/158; H02M 1/08
See application file for complete search history.

(56) References Cited

U.S. PATENT DOCUMENTS

| 6,084,790 A | * | 7/2000 | Wong | H02M 3/1584 |
| | | | | 323/272 |
| 2009/0256535 A1 | * | 10/2009 | Houston | H02M 3/1584 |
| | | | | 323/262 |
| 2016/0276924 A1 | * | 9/2016 | Castelli | H02M 1/4225 |

OTHER PUBLICATIONS

Digital Current Balancing for an Interleaved Boost PFC, Bosheng Sun, Texas Instruments Inc., 2013 (8 pages).
A New Current Balancing Method for Digitally Controlled Interleaved PFC, Marco Soldano, Xudong Huang, Gabriele Bernardinis, Botao Miao, Navdeep Dhanjal, Analog Devices Inc., 2012 (5 pages).

* cited by examiner

*Primary Examiner* — Kyle J Moody
*Assistant Examiner* — Trinh Q Dang
(74) *Attorney, Agent, or Firm* — Harness, Dickey & Pierce, P.L.C.

(57) ABSTRACT

According to some aspects of the present disclosure, example interleaved power supplies and corresponding control methods are disclosed. Example interleaved power supplies include an input terminal, an output terminal, and a first phase circuit coupled between the input terminal and the output terminal. The first phase circuit includes a first inductor and a first switch. The power supply also includes a second phase circuit coupled between the input terminal and the output terminal. The second phase circuit includes a second inductor and a second switch. The power supply further includes at least one current sensor, and a controller operable to control the first phase circuit and the second phase circuit in an interleaved mode when the sensed output current is below a current threshold and to control the first phase circuit and the second phase circuit in an in-phase mode when the output current is above the current threshold.

35 Claims, 4 Drawing Sheets

INTERLEAVED POWER SUPPLIES AND CORRESPONDING CONTROL METHODS

FIELD

The present disclosure relates to interleaved power supplies, including interleaved power factor correction (PFC) circuits, and corresponding control methods.

BACKGROUND

This section provides background information related to the present disclosure which is not necessarily prior art.

Interleaved power factor correction (PFC) circuit power supplies include multiple converter phase circuits that provide power to a load in different phases. Interleaved PFC circuit power supplies can reduce current ripple at the output of the power supply. Under some conditions, the current through different phases of the interleaved PFC circuit power supply may become unbalanced.

SUMMARY

This section provides a general summary of the disclosure, and is not a comprehensive disclosure of its full scope or all of its features.

According to one aspect of the present disclosure, an interleaved power supply includes an input terminal adapted to receive an input voltage, an output terminal adapted to provide an output current to a load, and a first phase circuit coupled between the input terminal and the output terminal. The first phase circuit includes a first inductor and a first switch coupled to the first inductor. The power supply also includes a second phase circuit coupled between the input terminal and the output terminal. The second phase circuit includes a second inductor and a second switch coupled to the second inductor. The power supply further includes at least one current sensor coupled to the output terminal to sense the output current, and a controller coupled to the current sensor, the first switch and the second switch. The controller is operable to control the first phase circuit and the second phase circuit in an interleaved mode when the sensed output current is below a current threshold and to control the first phase circuit and the second phase circuit in an in-phase mode when the output current is above the current threshold.

According to another aspect of the present disclosure, a method of controlling an interleaved power supply is disclosed. The power supply includes an input terminal adapted to receive an input voltage, an output terminal adapted to provide an output current to a load, a first phase circuit coupled between the input terminal and the output terminal, and a second phase circuit coupled between the input terminal and the output terminal, the first phase circuit including a first inductor and a first switch coupled to the first inductor, the second phase circuit including a second inductor and a second switch coupled to the second inductor. The method includes sensing an output current at the output terminal. When the sensed output current is below a current threshold, the method includes controlling the first phase circuit and the second phase circuit in an interleaved mode. When the sensed output current is above the current threshold, the method includes controlling the first phase circuit and the second phase circuit in an in-phase mode.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Figure 1:
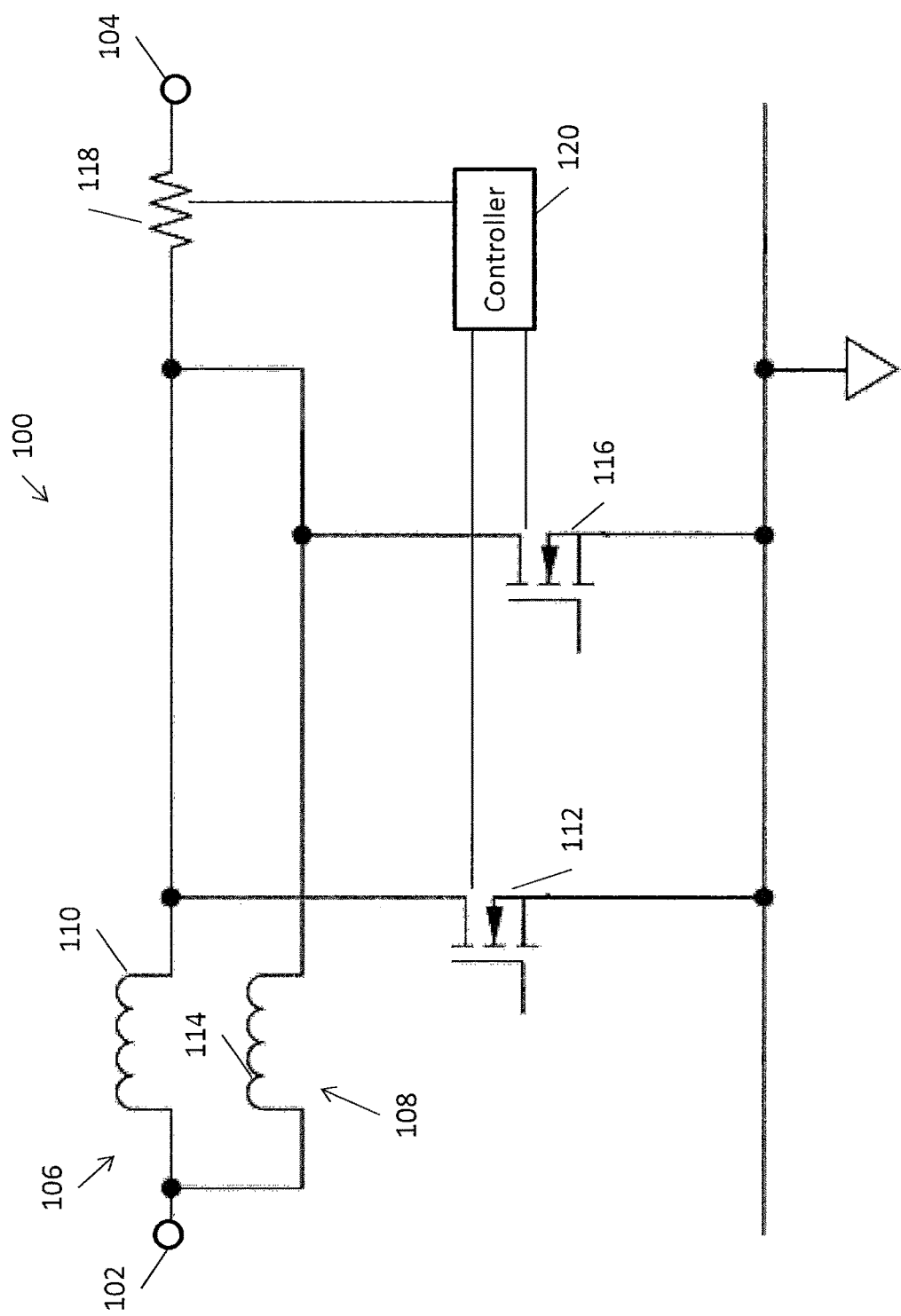
FIG. 1 is a diagram of an interleaved power supply, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An interleaved power supply according to one example embodiment of the present disclosure is illustrated in FIG. 1 and indicated generally by reference number 100. As shown in FIG. 1, the interleaved power supply 100 includes an input terminal 102 to receive an input voltage from a voltage source, and an output terminal 104 to provide an output current to a load.

The power supply 100 includes two phase circuits 106 and 108 coupled between the input terminal 102 and the output terminal. Phase circuit 106 includes an inductor 110, and a switch 112 coupled to the inductor 110. Phase circuit 108 includes an inductor 114, and a switch 116 coupled to the inductor 114.

The power supply 100 also includes a current sensor 118 coupled to the output terminal 104 to sense an output current of the power supply 100. A controller 120 is coupled to the current sensor 118, the switch 112 of phase circuit 106, and the switch 116 of phase circuit 108.

The controller 120 is operable to control the phase circuits 106 and 108 in an interleaved mode when the sensed output current is below a current threshold, and to control the phase circuits 106 and 108 in an in-phase mode when the sensed output current is above the current threshold.

In some embodiments, the current threshold may correspond to an output current value at which the current through the phase circuits 106 and 108 becomes unbalanced. For example, during normal operation at lower output current values, the controller 120 can operate the phase circuits 106 and 108 in an interleaved mode of operation, and the current in each phase may be substantially balanced (e.g., equal, within a range of tolerance with respect to one another, etc.). Once the output current increases to the current threshold (e.g. due to a surge current at the load, etc.), phase circuit 106 may conduct more current than phase circuit 108, or vice versa.

When the currents through the phase circuits 106 and 108 become unbalanced, the phase conducting the higher current may experience a high current stress, such as an upper current limit of the inductor 110 or 114, an upper current limit of the switch 112 or 116, etc. If the power supply 100 remains in an interleaved mode, it make take a substantially long time for the phase circuits 106 and 108 to become balanced again, and components of the phase circuits may experience high current stress for an extended duration.

In order to reduce the unbalanced current between phase circuits 106 and 108, the controller 120 can switch the phase circuits 106 and 108 to an in-phase mode of operation when the output current reaches the current threshold.

In some embodiments, switching the mode of operation from interleaved to in-phase may include increasing a current limit value of the power supply. For example, the current limit value of the power supply 100 during the interleaved mode of operation may not be sufficient to handle a full load current when the power supply 100 is operated in an in-phase mode. Once the power supply 100 becomes more balanced in the in-phase mode, the controller 120 can switch back to the interleaved mode of operation. When switching to the interleaved mode of operation, the controller 120 may reduce the current limit value of the power supply.

The controller 120 may switch operation from the in-phase mode to the interleaved mode based on any suitable condition. For example, the controller 120 may operate the power supply 100 in the in-phase mode for a fixed period of time (e.g., twenty milliseconds, fifty milliseconds, etc.) and then change operation back to the interleaved mode. The fixed period of time may correspond to a period of time sufficient to allow the output current to reduce below the current threshold, to reduce to a value that can be suitably handled by an interleaved mode of operation, etc.

In some embodiments, the controller 120 may switch operation from an in-phase mode to an interleaved mode when an AC input voltage of the power supply 100 is approximately zero (e.g., at a zero crossing of the AC input voltage, etc.). In this case, the output current should be significantly low (e.g., approximately zero) and the controller 120 can switch to an interleaved mode of operation. If the output current later exceeds the current threshold, the controller 120 can again change to an in-phase mode and then reset back to an interleaved mode at the next zero crossing of the AC input voltage.

In other embodiments, the controller 120 may switch back to an interleaved mode of operation when the output current reduces below a specified value. The specified value may be similar to the current threshold value for changing from the interleaved mode to the in-phase mode, may be lower than the current threshold value for changing from the interleaved mode to the in-phase mode (e.g., to create a hysteresis condition), etc. For example, the specified current value may be about zero amps.

The controller 120 may include any suitable hardware and/or software capable of controlling switches 112 and 116 to operate the phases of the power supply 100. For example, the controller 120 may include microprocessor, microcontroller, logic gates, integrated circuit(s), computer-executable instructions stored in memory, etc.

The input terminal 102 and output terminal 104 may include any suitable electrical connection for transferring voltage and/or current, including but not limited to an electrical connector, a wire, a circuit node, etc.

Figure 2:
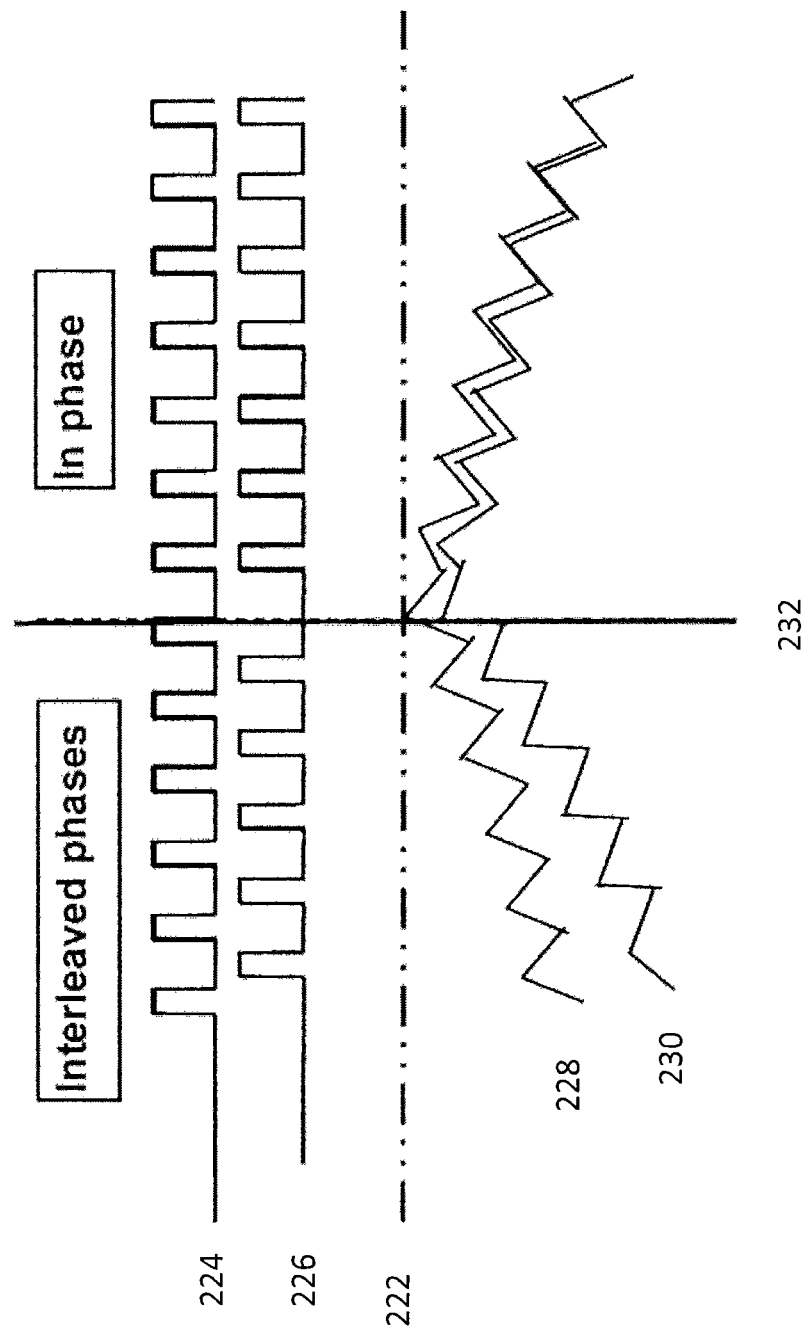
FIG. 2 is a line graph illustrating example control signals and inductor currents of the power supply of FIG. 1.

FIG. 2 illustrates example waveforms of control signals and inductor currents of the power supply 100 of FIG. 1. Signal 224 is a control signal from controller 120 to switch 112 of phase circuit 106, and signal 226 is a control signal from controller 120 to switch 116 of phase circuit 108. The switch control signals 224 and 226 are pulses to turn on switches 112 and 116, respectively. In this case, controller 120 can operate phase circuits 106 and 108 via control signals 224 and 226.

FIG. 2 also illustrates a current 228 through the inductor 110 of phase circuit 106, and a current 230 through the inductor 114 of phase circuit 108. As shown in FIG. 2, each pulse of signal 224 or 226 causes an increase in the corresponding inductor current 228 or 230.

FIG. 2 illustrates control signals 224 and 226 initially operating in an interleaved mode. For example, the control signals 224 and 226 cause the phase circuits 106 and 108 to operate about 180 degrees out of phase with one another. As shown in FIG. 2, operating the phase circuits 106 and 108 in an interleaved mode may cause the inductor currents 228 and 230 to reach a current threshold 222.

Once the inductor currents 228 and 230 reach the current threshold 222, the control signals 224 and 226 switch to an in-phase mode of operation at point 232. For example, the control signals 224 and 226 may be substantially synchronized to operate phase circuits 106 and 108 in substantially the same phase. Switching the control signals 224 and 226 to an in-phase mode of operation may cause the inductor currents 228 and 230 to decrease (e.g., as they become more balanced, etc.).

Figure 3:
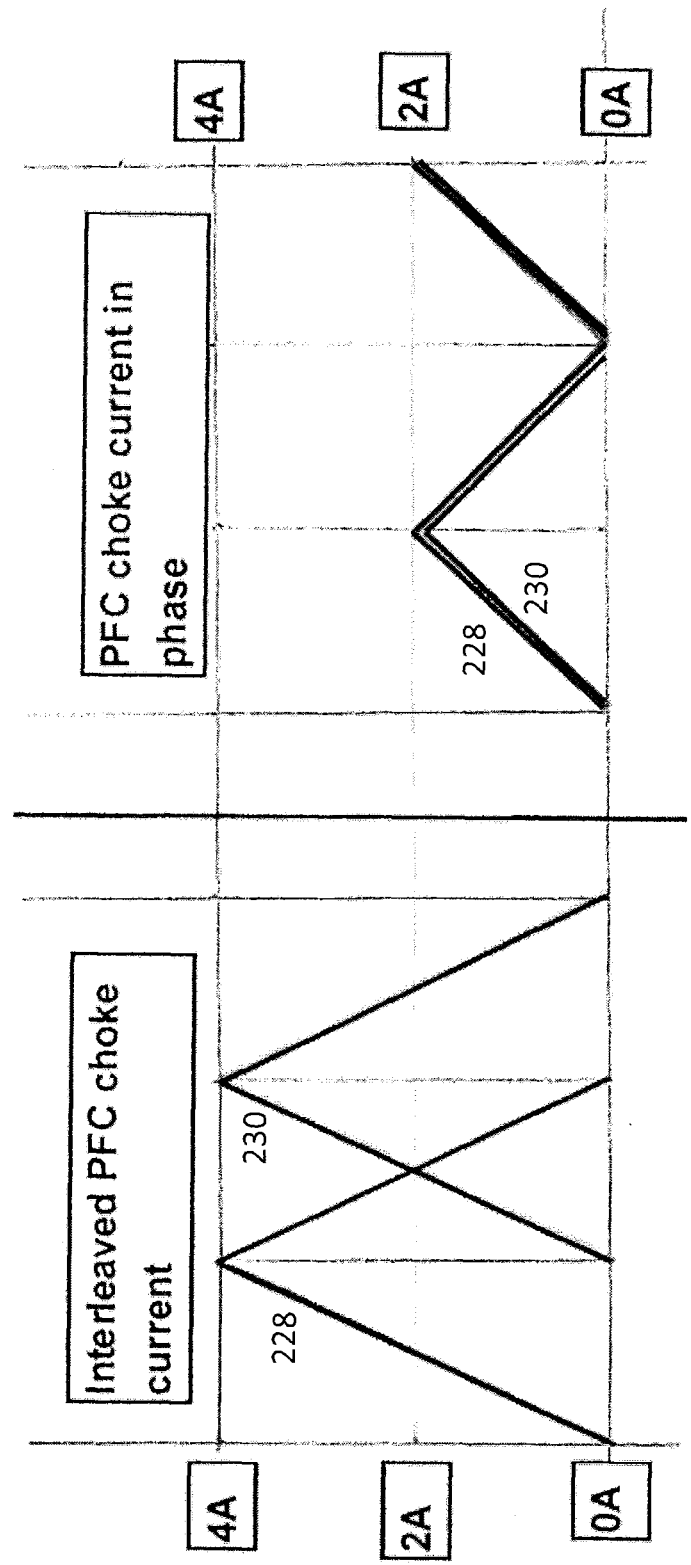
FIG. 3 is a line graph illustrating example inductor currents of the power supply of FIG. 1 during an interleaved mode of operation and an in-phase mode of operation.

FIG. 3 illustrates example values and phases for the inductor currents 228 and 230 during both the interleaved and in-phase modes of operation. As shown in FIG. 3, during interleaved operation the inductor currents 228 and 230 are about 180 degrees out of phase with one another. Each inductor current 228 and 230 reaches a peak current value of about 4 A. In this case, a current limit of the power supply may be set at about 4.8 A so that an interleaved mode of operation can deliver a full load current with about a twenty percent margin.

During in-phase operation the inductor currents 228 and 230 have about the same phase. Each inductor current 228 and 230 reaches a peak current value of about 2 A. In the in-phase mode, the 4.8 A current limit would allow 2.4 A for the inductor of each phase, thereby delivering only about 60% of the 4 A load demand. In this case, the current limit may be raised when the mode of operation is switched from interleaved to in-phase. For example, the current limit may be doubled to a value of 9.6 A, the current limit may be set lower than a double value (e.g., at about 8 A), etc. Once the power supply is stable (e.g., the currents are substantially balanced in each phase, etc.) the mode of operation may be changed back to interleaved mode and the current limit may be reset back to 4.8 A.

Figure 4:
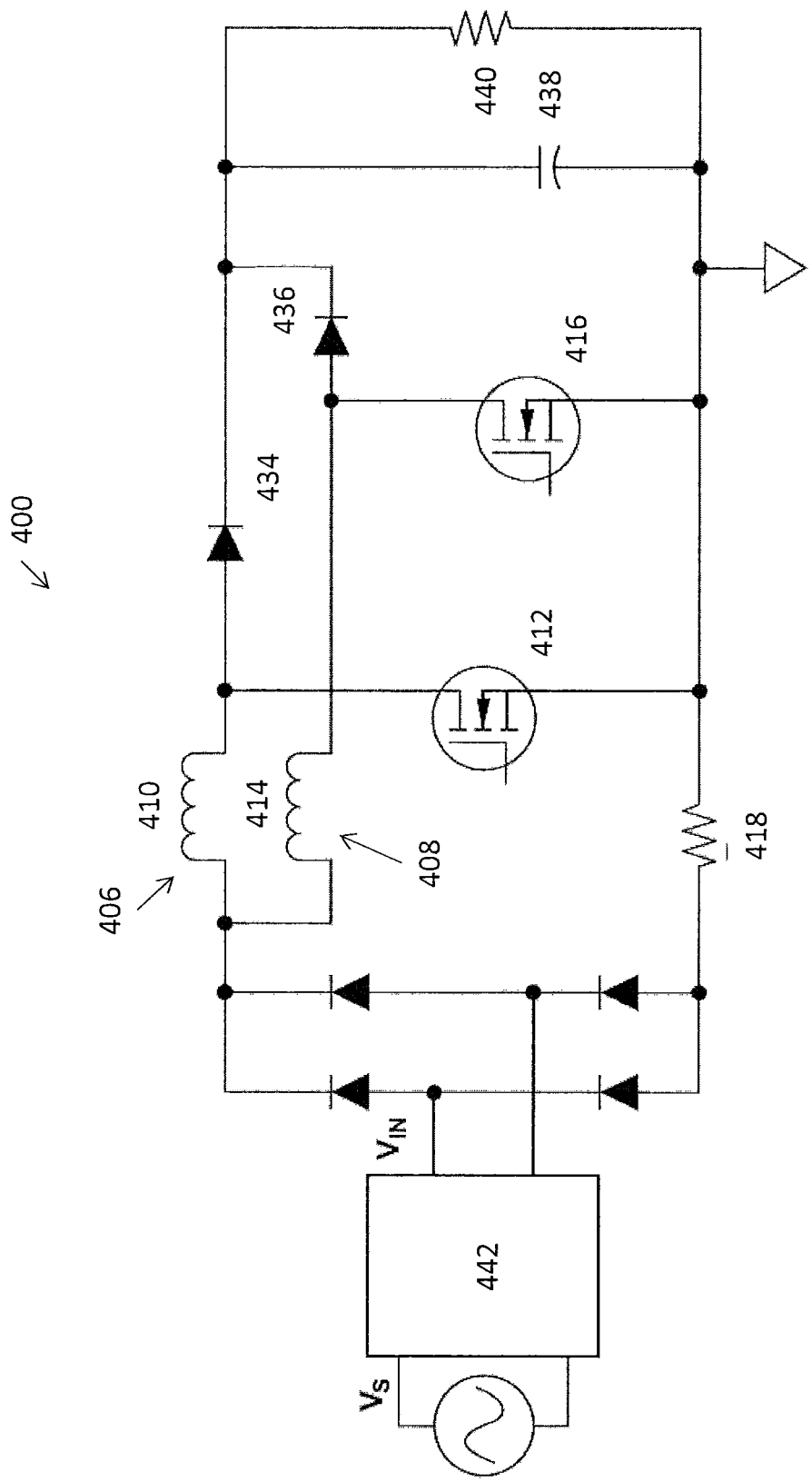
FIG. 4 is a diagram of an interleaved power supply according to another example embodiment of the present disclosure.

FIG. 4 illustrates an interleaved power supply 400 according to another example embodiment of the present disclosure. As shown in FIG. 4, the interleaved power supply 400 receives an input voltage from a voltage source Vs. An output of the power supply is coupled to a load 440 to provide an output current to the load. The power supply also includes an output capacitor 438 coupled in parallel with the load 440.

The power supply 400 includes a phase circuit 406 having an inductor 410, a switch 412 and a diode 434. In this case, the phase circuit 406 is arranged in a boost converter topology. The power supply 400 also includes a phase circuit 408 having an inductor 414, a switch 416 and a diode 436. The phase circuit 408 is arranged in a boost converter topology.

The voltage source Vs is coupled to an optional filter circuit 442. The optional filter circuit 442 may include an electromagnetic interference (EMI) filter, an inrush current limiter, etc.

The optional filter circuit 442 is coupled to a bridge circuit and provides an input voltage Vin to the bridge circuit. In this case, an alternating current (AC) from the voltage source Vs may be filtered and rectified to provide a direct current (DC) to the phase circuits 406 and 408.

The power supply 400 also includes a current sensor 418 to sense an output current of the power supply 400. When the sensed output current is below a current threshold, phase circuits 406 and 408 may be operated in an interleaved mode. When the sensed output current is above a current threshold, phase circuits 406 and 408 may be operated in an in-phase mode.

As shown in FIG. 4, phase circuits 406 and 408 are coupled in parallel. Accordingly, power supply 400 is an interleaved power factor correction (PFC) circuit power supply having two phases. As should be apparent, other embodiments may include more than two phases, may have phase circuits that are not coupled in parallel, may not include a power factor correction (PFC) circuit, etc.

Switches 412 and 416 are illustrated as field-effect transistor (FET) switches. As should be apparent, other embodiments may include other types of switches, more than one switch per phase circuit, etc.

Although phase circuits 406 and 408 are illustrated as boost converter topologies, other embodiments may include phase circuits having other converter topologies. For example, in some embodiments the phase circuits may include a boost converter coupled with a buck converter, etc.

The current sensor 418 may be any suitable current sensor capable of sensing an output current (e.g., a sense resistor, etc.). Although FIG. 4 illustrates only one current sensor 418, other embodiments may include more than one current sensor. For example, each phase circuit may include a current sensor coupled to the phase circuit to detect a current through the phase circuit. A controller may operate the phase circuit(s) based on current values of each phase circuit.

The current threshold may be any suitable threshold for changing operation of the power supply 400 from an interleaved mode to an in-phase mode. For example, as described above, the current threshold may be a current value at which the current through different phases of the power supply is unbalanced (e.g., one phase conducts substantially more current than another phase, etc.). This may cause current stress to one or more components of the phase circuit, such as an inductor of the phase circuit, a switch of the phase circuit, a diode of the phase circuit, etc.

In some embodiments, the current threshold may be a current value at which an inductor of a phase circuit approaches a saturation condition (e.g., the current reaches a maximum current value of the inductor, etc.).

The current threshold may be a current limit value of the power supply. For example, if the output current to the load reaches a limit value of the power supply (e.g., a maximum current that can be supplied by one phase circuit inductor), the power supply may be switched from an interleaved mode of operation to an in-phase mode of operation. In this case, the current limit may be increased to account for the change from interleaved operation to in-phase operation. In some embodiments, the current limit may be approximately doubled when switching from interleaved operation to in-phase operation.

The power supply may operate the phase circuits in any suitable interleaved arrangement during the interleaved mode of operation. For example, the phase circuits may be operated about 180 degrees out of phase form one another, may be operated with other phase shifts, etc. The phase circuits may be operated in a continuous mode during the interleaved operation, may be operated in a critical mode during the interleaved operation, etc.

In another embodiment, a method of controlling an interleaved power supply is disclosed. The power supply includes an input terminal adapted to receive an input voltage, an output terminal adapted to provide an output current to a load, a first phase circuit coupled between the input terminal and the output terminal, and a second phase circuit coupled between the input terminal and the output terminal, the first phase circuit including a first inductor and a first switch coupled to the first inductor, the second phase circuit including a second inductor and a second switch coupled to the second inductor. The method includes sensing an output current at the output terminal. When the sensed output current is below a current threshold, the method includes controlling the first phase circuit and the second phase circuit in an interleaved mode. When the sensed output current is above the current threshold, the method includes controlling the first phase circuit and the second phase circuit in an in-phase mode.

In some embodiments, the first phase circuit may include a first diode coupled to the first inductor, the second phase circuit may include a second diode coupled to the second inductor, the first switch may be a field-effect transistor, the second switch may be a field-effect transistor, the first phase circuit and the second phase circuit may be coupled in parallel, etc.

The current threshold may be a current value at which a current through the first phase circuit and a current through the second phase circuit are unbalanced, may be a current value at which at least one of the first inductor and the second inductor is at a saturation condition, may be a current limit value of the power supply.

The method may include increasing the current limit value when switching from the interleaved mode to the in-phase mode. The current limit value in the in-phase mode may be about double the current limit value in the interleaved mode.

Controlling the first phase circuit and the second phase circuit in an interleaved mode may include controlling the first phase circuit and the second phase circuit in a continuous mode of operation. Controlling the first phase circuit and the second phase circuit in an interleaved mode may include controlling the first phase circuit and the second phase circuit in a critical mode of operation.

In some embodiments, sensing an output current may include sensing an output current of the first phase circuit, and the method may further include sensing an output current of the second phase circuit.

The method may include changing operation of the first phase circuit and the second phase circuit from the in-phase mode to the interleaved mode a fixed period of time after the output current exceeds the current threshold. The fixed period of time may be between about twenty milliseconds and about fifty milliseconds.

The method may include changing operation of the first phase circuit and the second phase circuit from the in-phase mode to the interleaved mode once the output current reduces below a specified current value. For example, the specified current value may be substantially the same as the current threshold, the specified current value may be less than the current threshold (e.g., about zero amps, etc.), etc.

In some embodiments, the input voltage may be an AC input voltage. In those cases, the method may include changing operation of the first phase circuit and the second phase circuit from the in-phase mode to the interleaved mode at about a zero crossing of the AC input voltage (e.g., when the AC input is about zero and the corresponding output current is about zero).

Any of the example embodiments, aspects and/or features disclosed herein may be used in any suitable combination with any other example embodiments, aspects and/or features disclosed herein without departing from the scope of the present disclosure. For example, interleaved power supplies described herein may be operated using other methods, the example control methods described herein may be implemented with other interleaved power supplies, etc. without departing from the scope of the present disclosure.

An interleaved mode of operation may provide a lower ripple current than an in-phase mode of operation. However, different phases of an interleaved power supply may become unbalanced at a current limit condition (e.g., an inductor of one phase may be at saturation, etc.). An in-phase mode of operation may provide increased current balancing at the current limit condition. However, the in-phase mode of operation may provide higher current ripple than the interleaved mode of operation. Some example embodiments described herein may solve problems associated with conventional interleaved power supply current limit control, and may provide advantages associated with both interleaved operation and in-phase operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An interleaved power supply comprising:
an input terminal adapted to receive an input voltage;
an output terminal adapted to provide an output current to a load;
a first phase circuit coupled between the input terminal and the output terminal, the first phase circuit including a first inductor and a first switch coupled to the first inductor;
a second phase circuit coupled between the input terminal and the output terminal, the second phase circuit including a second inductor and a second switch coupled to the second inductor;
at least one current sensor coupled to the output terminal to sense the output current; and
a controller coupled to the current sensor, the first switch and the second switch, the controller operable to control the first phase circuit and the second phase circuit in an interleaved mode when the sensed output current is below a current threshold and to control the first phase circuit and the second phase circuit in an in-phase mode when the sensed output current is above the current threshold.

2. The power supply of claim 1, wherein the first phase circuit includes a first diode coupled to the first inductor and the second phase circuit includes a second diode coupled to the second inductor.

3. The power supply of claim 1, wherein the first switch is a field-effect transistor and the second switch is a field-effect transistor.

4. The power supply of claim 1, wherein the first phase circuit and the second phase circuit are coupled in parallel.

5. The power supply of claim 1, wherein the first phase circuit comprises a boost converter topology and the second phase circuit comprises a boost converter topology.

6. The power supply of claim 1, wherein the current threshold is an output current value at which a current through the first phase circuit and a current through the second phase circuit are unbalanced.

7. The power supply of claim 1, wherein the current threshold is an output current value at which at least one of the first inductor and the second inductor is at a saturation condition.

8. The power supply of claim 1, wherein the current threshold is a current limit value of the power supply.

9. The power supply of claim 1, wherein the controller is operable to control the first phase circuit and the second phase circuit in a continuous mode of operation during the interleaved mode.

10. The power supply of claim 1, wherein the controller is operable to control the first phase circuit and the second phase circuit in a critical mode of operation during the interleaved mode.

11. The power supply of claim 1, wherein the at least one current sensor is a first current sensor coupled to the first phase circuit to sense a current through the first phase circuit, the power supply further comprising a second current sensor coupled to the second phase circuit to sense a current through the second phase circuit.

12. The power supply of claim 1, wherein the controller is operable to change operation of the first phase circuit and the second phase circuit from the in-phase mode to the interleaved mode a fixed period of time after the sensed output current exceeds the current threshold.

13. The power supply of claim 1, wherein the controller is operable to change operation of the first phase circuit and the second phase circuit from the in-phase mode to the interleaved mode once the sensed output current reduces below a specified current value.

14. The power supply of claim 1, wherein the input voltage is an AC input voltage and the controller is operable to change operation of the first phase circuit and the second phase circuit from the in-phase mode to the interleaved mode at about a zero crossing of the AC input voltage.

15. The power supply of claim 8, wherein the controller is adapted to increase the current limit value when the controller switches from the interleaved mode to the in-phase mode.

16. The power supply of claim 12, wherein the fixed period of time is between about twenty milliseconds and about fifty milliseconds.

17. The power supply of claim 13, wherein the specified current value is substantially the same as the current threshold.

18. The power supply of claim 13, wherein the specified current value is less than the current threshold.

19. The power supply of claim 15, wherein the current limit value in the in-phase mode is about double the current limit value in the interleaved mode.

20. A method of controlling an interleaved power supply, the power supply including an input terminal adapted to receive an input voltage, an output terminal adapted to provide an output current to a load, a first phase circuit coupled between the input terminal and the output terminal, and a second phase circuit coupled between the input terminal and the output terminal, the first phase circuit including a first inductor and a first switch coupled to the first inductor, the second phase circuit including a second inductor and a second switch coupled to the second inductor, the method comprising:
   sensing an output current at the output terminal;
   when the sensed output current is below a current threshold, controlling the first phase circuit and the second phase circuit to operate in an interleaved mode; and
   when the sensed output current is above the current threshold, controlling the first phase circuit and the second phase circuit to operate in an in-phase mode.

21. The method of claim 20, wherein:
   the first phase circuit includes a first diode coupled to the first inductor;
   the second phase circuit includes a second diode coupled to the second inductor;
   the first switch is a field-effect transistor;
   the second switch is a field-effect transistor; and
   the first phase circuit and the second phase circuit are coupled in parallel.

22. The method of claim 20, wherein the current threshold is an output current value at which a current through the first phase circuit and a current through the second phase circuit are unbalanced.

23. The method of claim 20, wherein the current threshold is an output current value at which at least one of the first inductor and the second inductor is at a saturation condition.

24. The method of claim 20, wherein the current threshold is a current limit value of the power supply.

25. The method of claim 20, wherein controlling the first phase circuit and the second phase circuit in an interleaved mode includes controlling the first phase circuit and the second phase circuit in a continuous mode of operation.

26. The method of claim 20, wherein controlling the first phase circuit and the second phase circuit in an interleaved mode includes controlling the first phase circuit and the second phase circuit in a critical mode of operation.

27. The method of claim 20, wherein sensing an output current includes sensing an output current of the first phase circuit, the method further comprising sensing an output current of the second phase circuit.

28. The method of claim 20, further comprising changing operation of the first phase circuit and the second phase circuit from the in-phase mode to the interleaved mode a fixed period of time after the sensed output current exceeds the current threshold.

29. The method of claim 20, further comprising changing operation of the first phase circuit and the second phase circuit from the in-phase mode to the interleaved mode once the sensed output current reduces below a specified current value.

30. The method of claim 20, wherein the input voltage is an AC input voltage, the method further comprising changing operation of the first phase circuit and the second phase circuit from the in-phase mode to the interleaved mode at about a zero crossing of the AC input voltage.

31. The method of claim 24, further comprising increasing the current limit value when switching from the interleaved mode to the in-phase mode.

32. The method of claim 28, wherein the fixed period of time is between about twenty milliseconds and about fifty milliseconds.

33. The method of claim 29, wherein the specified current value is substantially the same as the current threshold.

34. The method of claim 29, wherein the specified current value is less than the current threshold.

35. The method of claim 31, wherein the current limit value in the in-phase mode is about double the current limit value in the interleaved mode.

* * * * *